(12) United States Patent
Lightsey et al.

(10) Patent No.: US 11,723,474 B2
(45) Date of Patent: Aug. 15, 2023

(54) AUTO RUN MODE FOR INITIATING HEATING CYCLE OF HEATED BEDDING PRODUCT

(71) Applicant: E & E CO., LTD., Fremont, CA (US)

(72) Inventors: Michael Lightsey, Anderson, SC (US); Mark Castracane, Hattiesburg, MS (US)

(73) Assignee: E & E CO., LTD., Fremont, CA (US)

( * ) Notice: Subject to any disclaimer, the term of this patent is extended or adjusted under 35 U.S.C. 154(b) by 344 days.

(21) Appl. No.: 17/061,308

(22) Filed: Oct. 1, 2020

(65) Prior Publication Data
US 2021/0015267 A1 Jan. 21, 2021

Related U.S. Application Data

(63) Continuation of application No. 15/621,928, filed on Jun. 13, 2017, now Pat. No. 10,820,715.

(51) Int. Cl.
| | | |
|---|---|---|
| A47C 21/04 | (2006.01) | |
| H05B 3/34 | (2006.01) | |
| H05B 1/02 | (2006.01) | |
| G05D 23/19 | (2006.01) | |
| A47G 9/02 | (2006.01) | |

(52) U.S. Cl.
CPC ......... A47C 21/048 (2013.01); H05B 1/0272 (2013.01); H05B 3/347 (2013.01); A47G 9/0215 (2013.01); G05D 23/19 (2013.01)

(58) Field of Classification Search
CPC ........ A47C 21/048; H05B 3/347; H05B 3/34; H05B 3/345; H05B 3/342; H05B 3/36; H05B 2203/029; H05B 2203/035; H05B 2203/003; H05B 2203/004; H05B 2203/007; H05B 2203/014; H05B 2203/017; H05B 2203/036; H05B 1/0272; A47G 9/0215; G05D 23/19; G05D 23/19; G05D 23/05

See application file for complete search history.

(56) References Cited

U.S. PATENT DOCUMENTS 4,656,334 A * 4/1987 Endo ................... A47C 21/048
219/505
5,770,836 A 6/1998 Weiss
(Continued)

OTHER PUBLICATIONS

The Electric Blanket Institute, "Electric Blanket with Timer for ON and OFF," http://www.electricblanketinstitute.com/electric-blanket-with-timer-for-on-and-off.html (accessed: Jun. 27, 2017).
(Continued)

Primary Examiner — Shawntina T Fuqua
(74) Attorney, Agent, or Firm — Knobbe, Martens, Olson & Bear, LLP

(57) ABSTRACT

This disclosure relates to an auto run mode for initiating a heating cycle of a heated bedding product. A heated bedding product can include a bedding product body comprising a heating element and a controller electrically connected to the heating element. The controller can include a processing circuit, such as a microcontroller, that is configured to operate in an auto run mode in which a heating cycle of the heating element is automatically initiated in response to alternating current power being provided to the controller.

19 Claims, 6 Drawing Sheets

(56) References Cited

U.S. PATENT DOCUMENTS

| | | | |
|---|---|---|---|
| 6,172,344 | B1 | 1/2001 | Gordon et al. |
| 6,222,162 | B1 | 4/2001 | Keane |
| 6,768,086 | B2 | 7/2004 | Sullivan et al. |
| 6,770,854 | B1 | 8/2004 | Keane |
| 7,115,842 | B2 | 10/2006 | Keane |
| 7,180,037 | B2 | 2/2007 | Weiss |
| 7,196,482 | B2 | 3/2007 | Krieger et al. |
| 7,351,938 | B2 | 4/2008 | Keane |
| 2003/0052120 | A1 | 3/2003 | Zabrowsky et al. |
| 2007/0221645 | A1 | 9/2007 | Castracane et al. |
| 2011/0042900 | A1 | 2/2011 | Hutchinson |
| 2012/0228279 | A1* | 9/2012 | Haas .................. H05B 1/02 219/211 |
| 2016/0008165 | A1 | 1/2016 | Baelden et al. |
| 2018/0116415 | A1* | 5/2018 | Karschnik ............ A61B 5/4809 |
| 2018/0352968 | A1 | 12/2018 | Lightsey et al. |
| 2020/0337470 | A1* | 10/2020 | Sayadi ................ A47C 31/123 |

OTHER PUBLICATIONS

The Electric Blanket Institute, "What to Look For When Purchasing Electric Blankets or Heated Mattress Pads," http://www.electricblanketinstitute.com/buyers-guide.html (accessed: Jun. 27, 2017).

Integrated Electronic Solutions Pty Ltd., "IES5434 Electric Dual Blanket Controller with Timing," Revision 1.0, Jun. 6, 2007, available at: www.mouser.com/ds/2/183/ies5431-datasheet-3601.pdf (accessed: Jun. 27, 2017).

Topcom, "Coral Fleece Electrical Heating Blanket CF-201: User Manual," version 1.0, Jun. 2011, downloaded from: http://icecat.us/us/p/tristar/bw-4770/electric-blankets-pillows-5411519016492-Electrical+over+blanket-17699073.html (downloaded: Jun. 29, 2017).

Roberts, Adam, "Switch puts you in control of your power," last updated Jan. 10, 2013, http://www.stuff.co.nz/technology/gadgets/9230419/Switch-puts-you-in-control-of-your-power (accessed: Jun. 27, 2017).

WEMO Community, "Turn on heated mattress pad remotely?", last post Dec. 28, 2015, available at: http://community.wemo.com/t5/WEMO-Hardware/Turn-on-heated-mattress-pad-remotely/td-p/25612 (accessed: Jun. 27, 2017).

WEMO Community, "Wemo Electric Blanket", last post Jun. 15, 2015, available at: http://community.wemo.eom/t5/WEMO-Hardware/Wemo-Electric-Blanket/td-p/11417 (accessed: Jun. 27, 2017).

INSTEON Solutions, "Control your electric blanket with remote control," copyright 2017, available at: https://www.envioustechnology.com.au/insteon/solution.php?ID=1 8 (accessed: Jun. 27, 2017).

Grady, Emcee, "Engineering Roundtable- Digitizing Your Electronic Blanket," Jan. 30, 2013, available at: https://www.sparkfun.com/news/1062 (accessed: Jun. 27, 2017).

\* cited by examiner

AUTO RUN MODE FOR INITIATING HEATING CYCLE OF HEATED BEDDING PRODUCT

CROSS REFERENCE TO PRIORITY APPLICATION

Any and all applications for which a foreign or domestic priority claim is identified in the Application Data Sheet as filed with the present application are hereby incorporated by reference under 37 CFR § 1.57. This application is a continuation of U.S. patent application Ser. No. 15/621,928, filed Jun. 13, 2017 and titled "AUTO RUN MODE FOR INITIATING HEATING CYCLE OF HEATED BEDDING PRODUCT," the disclosure of which is hereby incorporated by reference in its entirety herein.

BACKGROUND

Technical Field

Embodiments of the disclosed technology relate to heated bedding products.

Description of the Related Technology

This disclosure relates to heated bedding products. Example heated bedding products include electric blankets, electric mattress pads, electric throws, electric sheets, electric quilts, electrically heated mattresses, electric foot warmers, and the like. Heated bedding products can pre-warm a bed and avoid a chilling feeling of getting into a cold bed. Heated bedding products can provide an energy efficient way to stay warm on a cold night.

Modern heated bedding controllers utilize microcontroller based solid state electronics to control energy supplied to a heating element rather than mechanical switches and mechanical thermostats. Modern controllers can include switches to toggle the unit "on" or "off." In such microcontroller based platforms, heating can be initiated by a user taking action, such as physically pushing a button, after a controller is plugged into an alternating current (AC) power source.

SUMMARY OF CERTAIN INVENTIVE ASPECTS

The innovations described in the claims each have several aspects, no single one of which is solely responsible for its desirable attributes. Without limiting the scope of the claims, some prominent features will now be briefly discussed.

One aspect of this disclosure is a heated bedding system that includes a bedding product body comprising a heating element, a controller electrically connected to the heating element, and a voltage switching device connected to the controller. The controller comprises a processing circuit configured to operate in an auto run mode in which a heating cycle of the heating element automatically initiated in response to alternating current power being provided to the controller. The voltage switching device is configured to provide alternating current power from an alternating current outlet to the controller in a first state and to isolate the controller from the alternating current outlet in a second state.

The voltage switching device can include one of a digital timer, a mechanical timers, a Wi-Fi outlet switch, or a home automation system.

Another aspect of this disclosure is a heated bedding product comprising a bedding product body comprising a heating element and a controller electrically connected to the heating element. The controller includes a processing circuit configured to operate in an auto run mode in which a heating cycle of the heating element is automatically initiated in response to alternating current power being provided to the controller.

The processing circuit can be a microcontroller. The processing circuit can emulate an air gap switch in an on position in the auto run mode. The processing circuit can activate the auto run mode in response to user input.

The controller can accept user input and adjust one or more settings in response to the user input while alternating current power is being provided to the controller. The controller can set a heating level associated with the heating element for the auto run mode based on a temperature setting of a previous heating cycle. The controller can terminate the heating cycle in response to a predetermined period of time elapsing.

The processing circuit can perform a start-up test prior to automatically initiating the heating cycle in the auto run mode and to only automatically initiate the heating cycle of the heating element in response to passing the start-up test.

The heating bedding product can comply with a UL 964 standard. The heating bedding product can be an electric blanket.

The controller can further include a temperature control circuit electrically connected to the processing circuit and configured to control a temperature associated with the heating element.

Another aspect of this disclosure is a method of operating a heated bedding product. The method comprises running a self-test check in response to an alternating current power being provided to a controller of the heated bedding product, the controller being configured to control a heating element of the heated bedding product; and automatically initiating a heating cycle of the heating element in response to passing the self-test check and the controller being in an auto run mode.

The method can include setting the controller to the auto run mode in response to receiving user input. The method can include setting a temperature of the heating cycle prior to said automatically initiating the heating cycle. The method can include setting an auto-shutdown time of the heating cycle prior to said automatically initiating the heating cycle.

The method can include wirelessly receiving a control signal that causes a voltage switch to electrically connect the controller to an alternating current outlet and thereby provide the alternating current power to the controller.

The method can include receiving an input to cause a voltage switch to electrically connect the controller to an alternating current outlet after a predetermined period of time and thereby provide the alternating current power to the controller. The controller can include a microcontroller configured to operate in the auto run mode.

BRIEF DESCRIPTION OF THE DRAWINGS

FIG. 4 is split into FIG. 4(A) and FIG. 4(B) for readability.

DETAILED DESCRIPTION OF CERTAIN EMBODIMENTS

Figure 1:
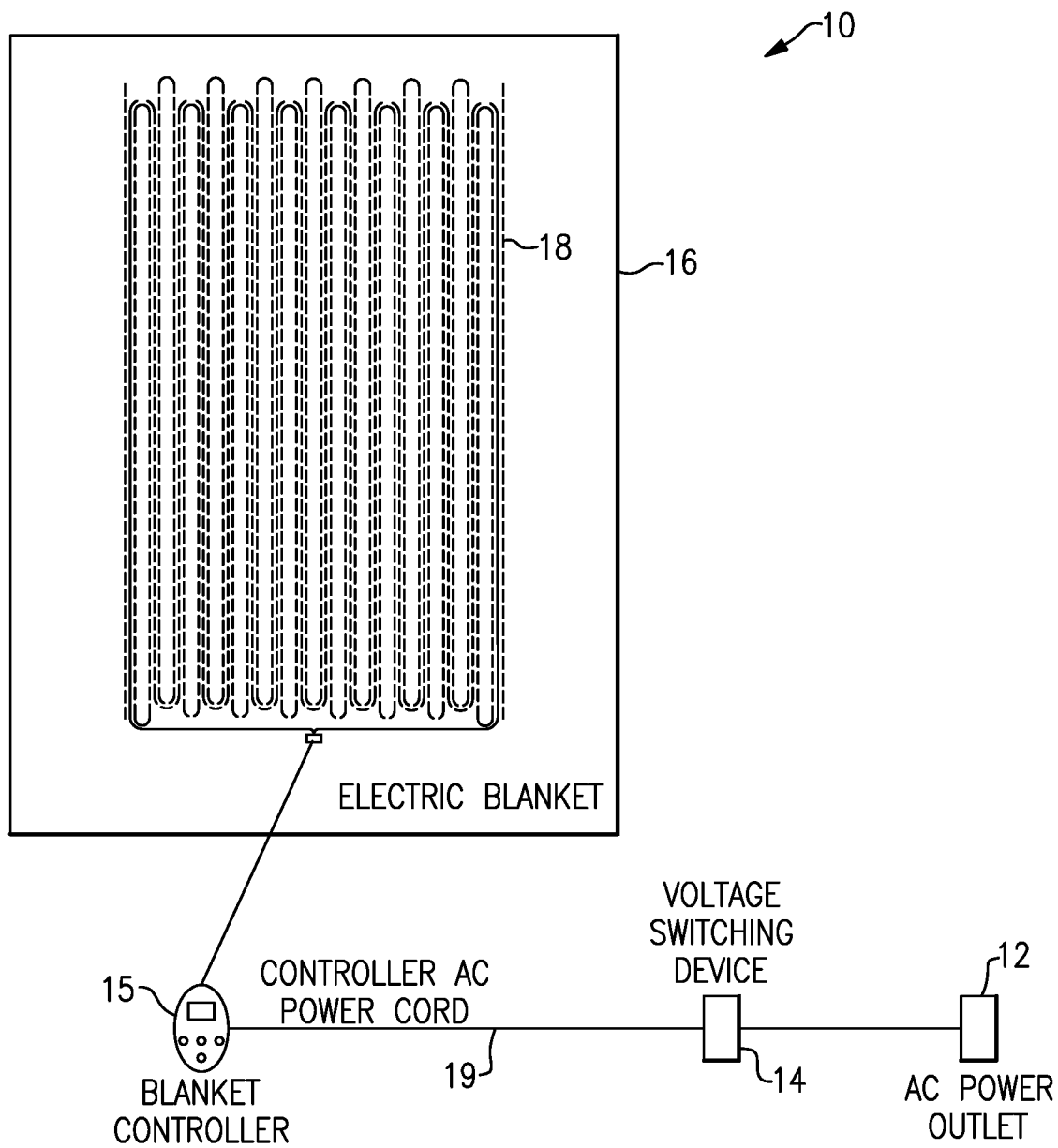
FIG. 1 is a schematic diagram of a heated bedding system connected to an alternating current (AC) power outlet.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The UL 964 standard is a standard for electrically heated bedding products. This standard includes a comprehensive set of regulations. Heated bedding products can be certified to the meet the UL 964 standard and then marked accordingly. This can assure consumers that such heating bedding products are safe to use. Accordingly, it can be desirable for a heated bedding product to meet the UL 964 standard. Manufacturers are therefore discouraged from designing products that will not be certified as meeting the UL 964 standard. Various ways of automatically turning on a heated bedding product would not comply with the current UL 964 standard and/or testers will not certify that such heated bedding products comply with the UL 964 standard. Accordingly, such ways of automatically turning on a heated bedding product would be avoided. Current heated bedding products involve user action after applying alternating current (AC) power to initiate heating.

Aspects of this disclosure relate to configuring a controller to enable a user selectable auto run mode to initiate a heating cycle of a heated bedding product in response to AC power being applied to the controller. In the auto run mode, the heating cycle is initiated without user action after AC power is applied to the controller. The functionality of the auto run mode can be implemented by programming the firmware of a microcontroller. A heated bedding product that includes such a microcontroller can comply with the current UL 964 standard. AC power can be provided to the controller by a voltage switching device connected to a household AC power outlet. The auto run mode can be selected and/or de-selected by one or more user interface commands. Such user interface commands can be outlined in a user manual. An indication, such as visual indication, of auto run mode selection can be displayed or otherwise provided to indicate that the auto run mode is active. Similarly, an indication of auto run mode de-selection can be provided to indicate that auto run is inactive. The controller can automatically shut off the heating element after a predetermined time-out period, such as 10 hours. When AC power is removed for a sufficient amount time to allow the microcontroller to reset, a heating cycle of the heated bedding product can be automatically activated again by a subsequent application of AC power to the controller while in the auto run mode.

Any suitable principles and advantages discussed herein can be implemented by a processing circuit of a controller of a heated bedding product. The processing circuit includes physical circuitry and non-transitory memory configured to store instructions executable by the physical circuitry. The physical circuitry can include solid state electronics. A processing circuit can be a microcontroller. Alternatively, a processing circuit can be a microprocessor combined with external peripherals. The processing circuit can operate in an auto run mode in accordance with one or more features discussed herein. While example embodiments and functionality may be described with reference to a microcontroller, one or more features discussed herein can be implemented in any other suitable processing circuit of a controller of a heated bedding product.

As discussed above, in microcontroller based heated bedding products platforms, heating can be initiated by a user taking action, such as physically pushing a button, after a controller is plugged into an AC power source. Under a number of circumstances, this functionality of a microcontroller based platform that involves user action to initiate heating can be desirable, as it enables a heating cycle to be initiated only by direct action of a user. Moreover, such functionality can comply with the current UL 964 standard. However, this same operational characteristic involving user action can prevent a heating cycle from being initiated by an external switch applying AC power to the controller because applying AC power would only result in the powering of the microcontroller and associated circuitry. The heating cycle would not begin in such a platform without the user pushing a button or otherwise activing the heating cycle.

Microcontrollers disclosed herein can operate in an auto run mode that can automatically begin a heating cycle after a power up self-test is complete. Accordingly, the heating cycle can begin without user action after AC power is applied to a controller. The microcontroller can begin the heating cycle at a heating level that was last used and/or a previously set auto run heating level. Such a heating level can be set, for example, by a mechanical temperature dial or other device, a non-volatile memory circuit storing to a heating setting received by a user interface, or the like. The heated bedding product can continue the heating cycle until an automatic timer feature ends the heating cycle. Disconnecting AC power from the controller that includes the microcontroller, can allow a power supply of the microcontroller to drop to a level to allow for a reset. After the microcontroller is reset, a new heating cycle can be initiated. The new heating cycle can be automatically initiated in response to AC power being applied to the controller in the auto run mode and the new heating cycle can run until automatic shut off once again occurs.

The microcontrollers discussed herein can allow a controller of a heated bedding product to operate with one or more external line voltage switching devices. Example voltage switching devices include, but are not limited to, automatic timers such as mechanical timers or digital timers, switches controlled by wireless signals such as Wi-Fi switches or other switches controlled by wireless local area network signals, home automation systems, or any suitable device with the ability to toggle the on/off state of an AC line voltage.

While AC power is continuously applied to the controller, a user can achieve full control of the device by the use of the device's user interface. For instance, the controller can receive control inputs that can override any automatic operation.

Microcontrollers discussed herein can be programmed to emulate an air gap switch that is left in the "on" position. This can enable the microcontroller to automatically initiate a heating cycle of a heated bedding product in response to AC power being applied to a controller of the heated bedding product. As such, no user action is needed to initiate a heating cycle unlike microcontroller based heated bedding controllers that require user action, such as a button push, to initiate a heating cycle after AC power is applied to a controller. Microcontrollers disclosed herein can comply with the current UL 964 standard.

Microcontrollers discussed herein can enable a heated bedding product to be turned on remotely and/or to be set to be turned on at a set time in the future. As one example, a user can wirelessly control a Wi-Fi switch connected between a controller of a heated bedding product and an AC outlet. The user can toggle a state of the Wi-Fi switch such that the Wi-Fi switch enters a state in which it applies AC power from the AC outlet to the controller. A microcontroller of the controller can then automatically initiate a heating cycle of the heated bedding product in accordance with the principles and advantages discussed herein. As another example, a timer, such as a mechanical timer or a digital timer, can be connected between a controller of a heated bedding product and an AC outlet. The user can set the time such that it applies AC power from the AC outlet to the controller in response to a set time elapsing. A microcontroller of the controller can then automatically initiate a heating cycle of the heated bedding product in accordance with the principles and advantages discussed herein. Microcontrollers discussed herein can also automatically initiate a heating cycle after a power outage in response to power being restored to a controller.

FIG. 1 is schematic diagram of a heated bedding system 10 connected to an AC power outlet 12. The illustrated heated bedding system 10 includes a heated bedding product and a voltage switching device 14. As illustrated, the heated bedding product includes a controller 15, a bedding product body 16 with an embedded heating element 18, and a power cord 19. In FIG. 1, the heated bedding product is an electric blanket.

The controller 15 is configured to turn the heating element 18 on and off and to adjust an amount of heat provided by the heating element 18. The controller 15 can include a microcontroller implemented in accordance with any of the principles and advantages discussed herein. In FIG. 1, the controller 15 is connected to the voltage switching device 14 by the power cord 19.

The voltage switching device 14 can selectively provide AC power from the AC power outlet 12 to the controller 15. The voltage switching device 14 can be implemented by any suitable device configured to toggle between a first state that provides an AC line voltage from the AC power outlet 12 to the controller 15 and a second state in which the controller 15 is disconnected and/or electrically isolated from the AC power outlet 12. The AC power outlet 12 can be any suitable AC power outlet, such as a household AC power outlet.

Figure 2:
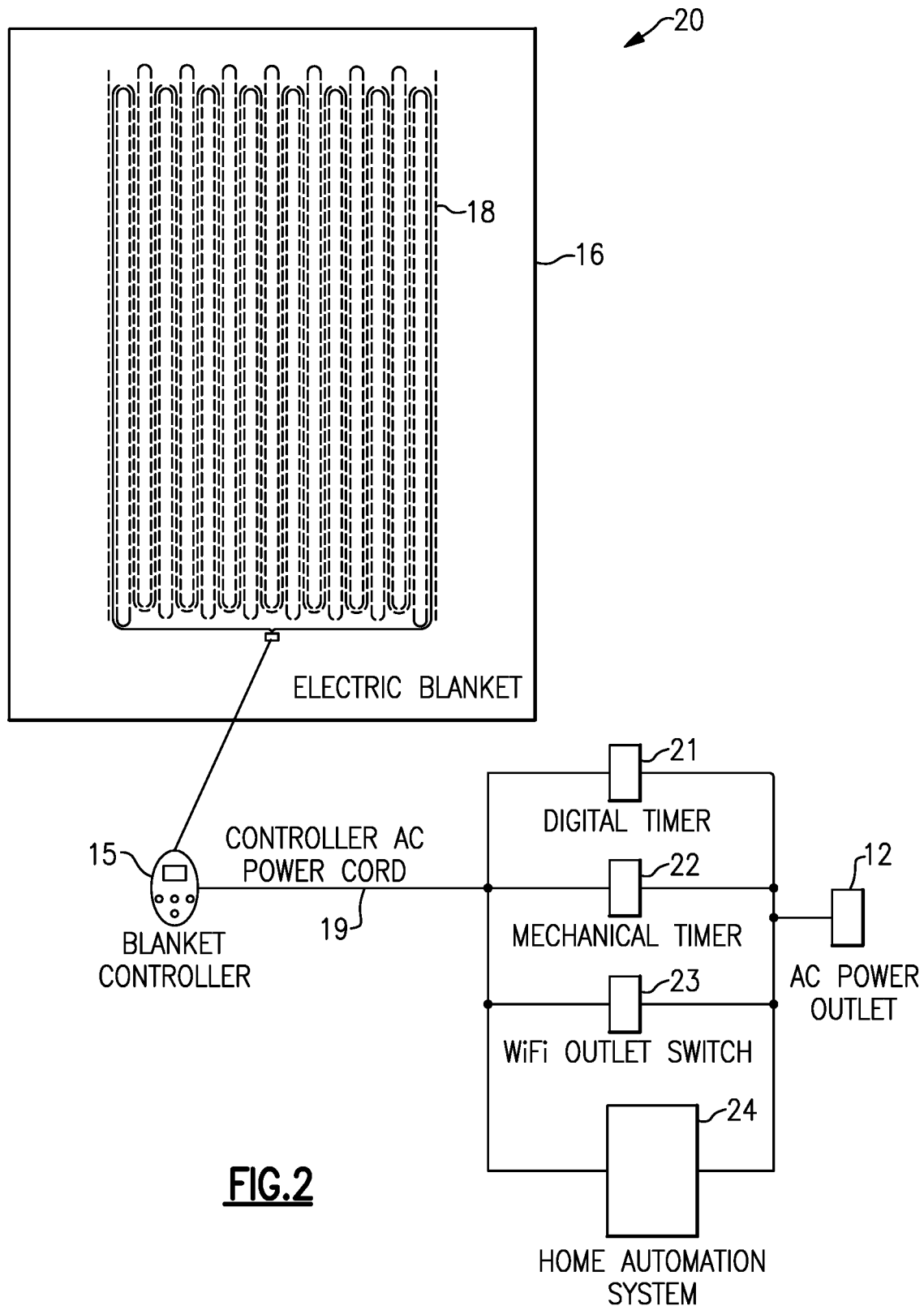
FIG. 2 is a schematic diagram of another heated bedding system connected to an AC power outlet.

FIG. 2 is schematic diagram of a heated bedding system 20 connected to an AC power outlet 12. The heated bedding system 20 is like the heated bedding system 10 of FIG. 1, except that example voltage switching devices are shown instead of the voltage switching device 14. FIG. 2 illustrates that one or more of a digital timer 21, a mechanical timer 22, a Wi-Fi outlet switch 23, or a home automatic system 24 can implement a voltage switching device. For example, any one of the voltage switching devices shown in FIG. 2 can be connected between the controller 15 and the AC power outlet 12. In some other implementations, two or more of the voltage switching devices shown in FIG. 2 can be connected between the controller 15 and the AC power outlet 12. In such implementations, a plurality of controller AC power cords can be connected to the controller 15 with voltage switching devices and/or one or more intervening device can be connected between an AC power cord and voltage switching devices.

Figure 3:
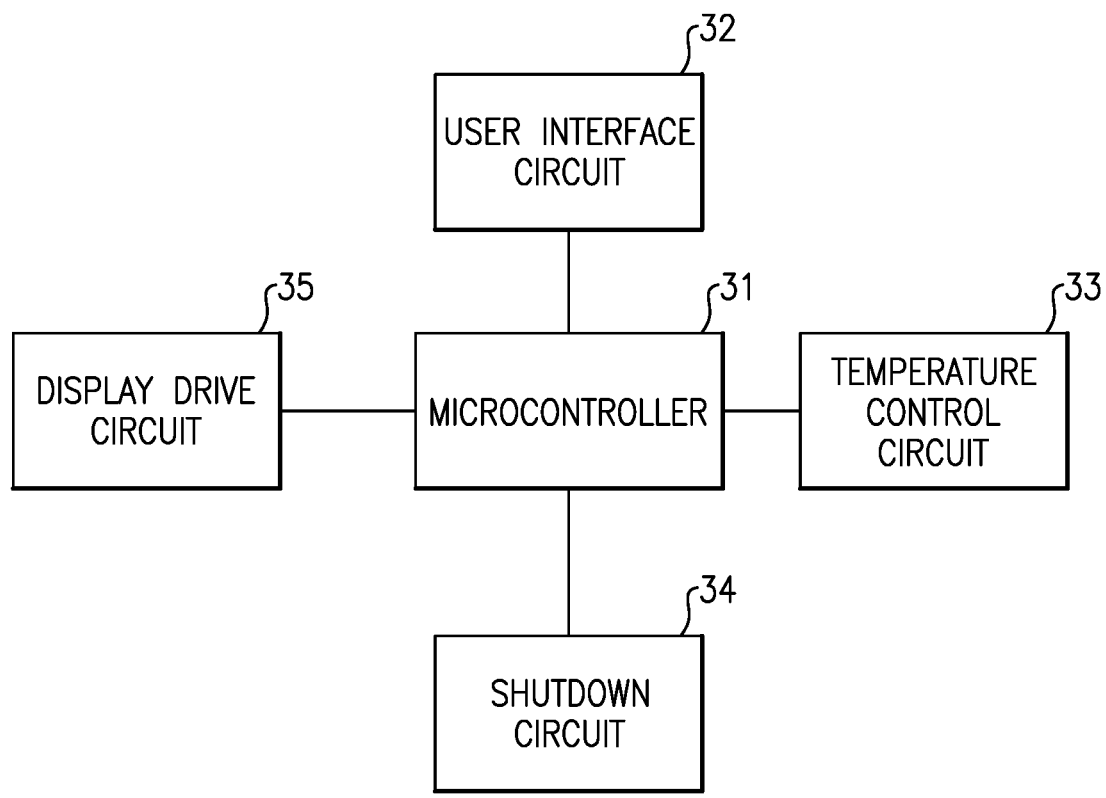
FIG. 3 is schematic block diagram of a controller of a heated bedding product that includes a microcontroller according to an embodiment.

FIG. 3 is schematic block diagram of a controller, such as the controller 15 of FIG. 1 and/or FIG. 2. The controller can be implemented by any suitable circuitry. As illustrated, the controller includes a microcontroller 31, a user interface circuit 32, a temperature control circuit 33, a shutdown circuit 34, and a display drive circuit 35.

The microcontroller 31 can implement any of the principles and advantages of the microcontrollers discussed herein. The microcontroller 31 can be programmed with custom firmware. The microcontroller 31 can monitor operator switch functions. The microcontroller 31 can provide feedback to a user via a display or light emitting diode. The microcontroller 31 can monitor temperature of a heating element of a heated bedding product. The microcontroller 31 can monitor the heating element for faults. The microcontroller 31 can power on/off the heating element based on test result. The microcontroller 31 can cause the heating element to be shut down in response to detecting a potentially unsafe condition. The microcontroller 31 can power the controller off in response to detecting a potential safety issue. The microcontroller 31 can maintain user settings in memory.

The user interface circuit 32 can receive user input and provide one or more signals to the microcontroller 31. For example, the user interface circuit 32 can receive user input to select the auto run mode and/or to de-select the auto run mode and provide one or more signals to the microcontroller 31 to toggle the auto run mode.

An example of activating the auto run mode will now be described. Such operations can be outlined in a user manual. The controller is turned off. While the controller is off, one or more buttons can be pushed for a threshold period of time. For instance, a preheat button and an up button can be pushed for approximately 2 seconds until a user interface provides an indication, such as displaying one or more different characters or a light emitting diode blinking, that auto run mode has been activated. The buttons can be released to allow the user interface to stop providing the indication, such as by turning a display or light emitter diode off. Then the controller can be set in auto run mode.

An example of deactivating the auto run mode will now be described. The controller is turned off. While the controller is off, one or more buttons can be pushed for a threshold period of time. For instance, a preheat button and an up button can be pushed for approximately 2 seconds until a user interface provides an indication, such as displaying one or more different characters or a light emitting diode blinking, that auto run mode has been deactivated. This indication can be different than the indication of the autorun mode being activated, such as displaying one or more different characters or providing a different number of blinks. The buttons can be released to allow the user interface to stop providing the indication of auto run mode being deactivated, such as by turning a display or light emitter diode off. Then the auto mode of the controller can be deactivated and the controller can operate in a normal mode.

The temperature control circuit 33 can cause a temperature associated with a heating element, such as the heating element 18 of FIG. 1 and/or FIG. 2, to be adjusted based on a temperature control signal from the microcontroller 31.

The shutdown circuit 34 can cause the heating element to turn off. For example, the shutdown circuit 34 can cause the heating element to turn off in response to a shutdown signal from the microcontroller 31. The microcontroller 31 can assert the shutdown signal in response to a period of time elapsing and/or detecting that a test has failed. As another example, the shutdown circuit 34 can sense a condition and turn off the heating element in response to sensing the condition. The display drive circuit 35 can control a display, such as a liquid crystal display (LCD). For instance, the display drive circuit 35 can cause a visual confirmation to be displayed in response to the microcontroller 31 providing a signal indicating that auto run mode has been selected.

Figure 4A:
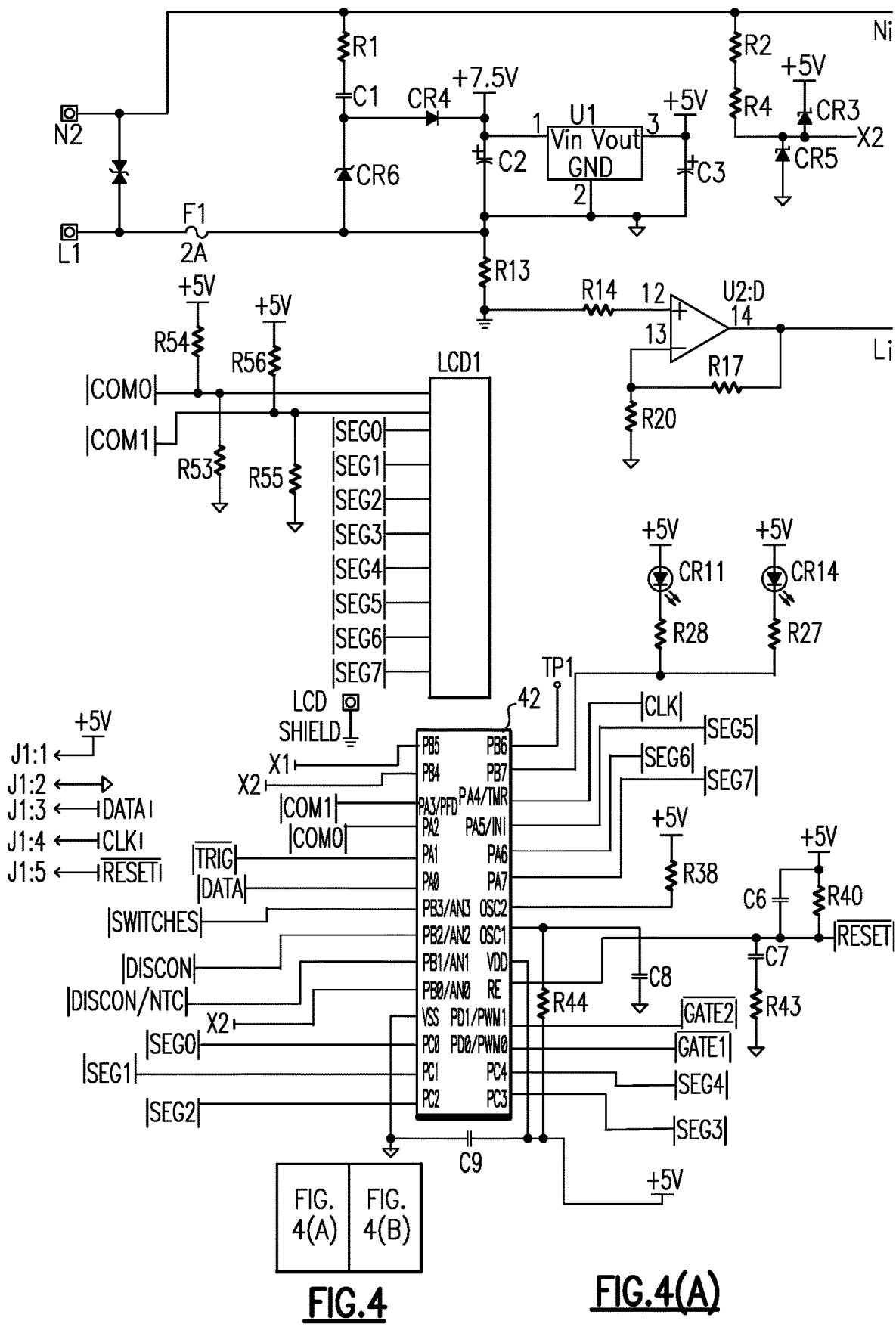
FIG. 4 is a more detailed schematic block diagram of a controller of a heated bedding product that includes a microcontroller according to an embodiment.
Figure 4B:
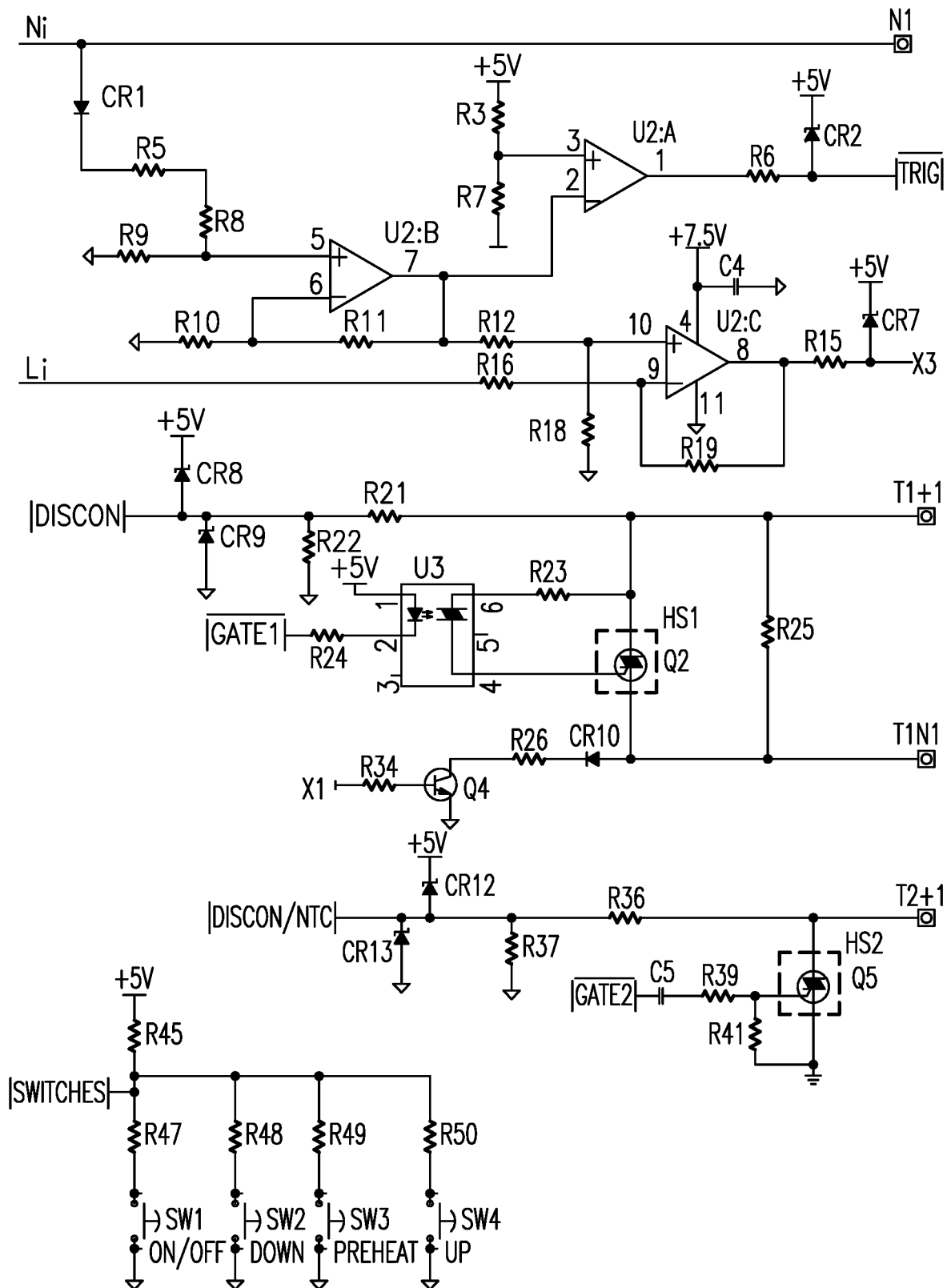

FIG. 4 is schematic diagram of a controller, such as the controller 15 of FIG. 1 and/or FIG. 2. FIG. 4 is split into FIG. 4(A) and FIG. 4(B) for readability. The illustrated controller includes a microcontroller 42, LCD drive circuit LCD1, first to fourth switches SW1 to S4, respectively, fuse F1, first to fifty fifth resistors R1 to R55, respectively, first to ninth capacitors C1 to C9, respectively, first to fourteenth diodes CR1 to CR14, respectively, voltage regulator U1, first to fourth amplifiers U2:A to U2D, respectively, optoisolator U3, thyristor devices Q2 and Q5, and transistor Q4. In FIG. 4, the microcontroller 42 can implement any of the principles and advantages of the microcontrollers discussed herein. The other illustrated circuitry can implement features described with reference to FIG. 3, for example. For instance, the LCD drive circuit LCD1 can implement a display drive circuit. As another example, the switches SW1, SW2, SW3, and S4 can be included in a user interface circuit.

Figure 5:
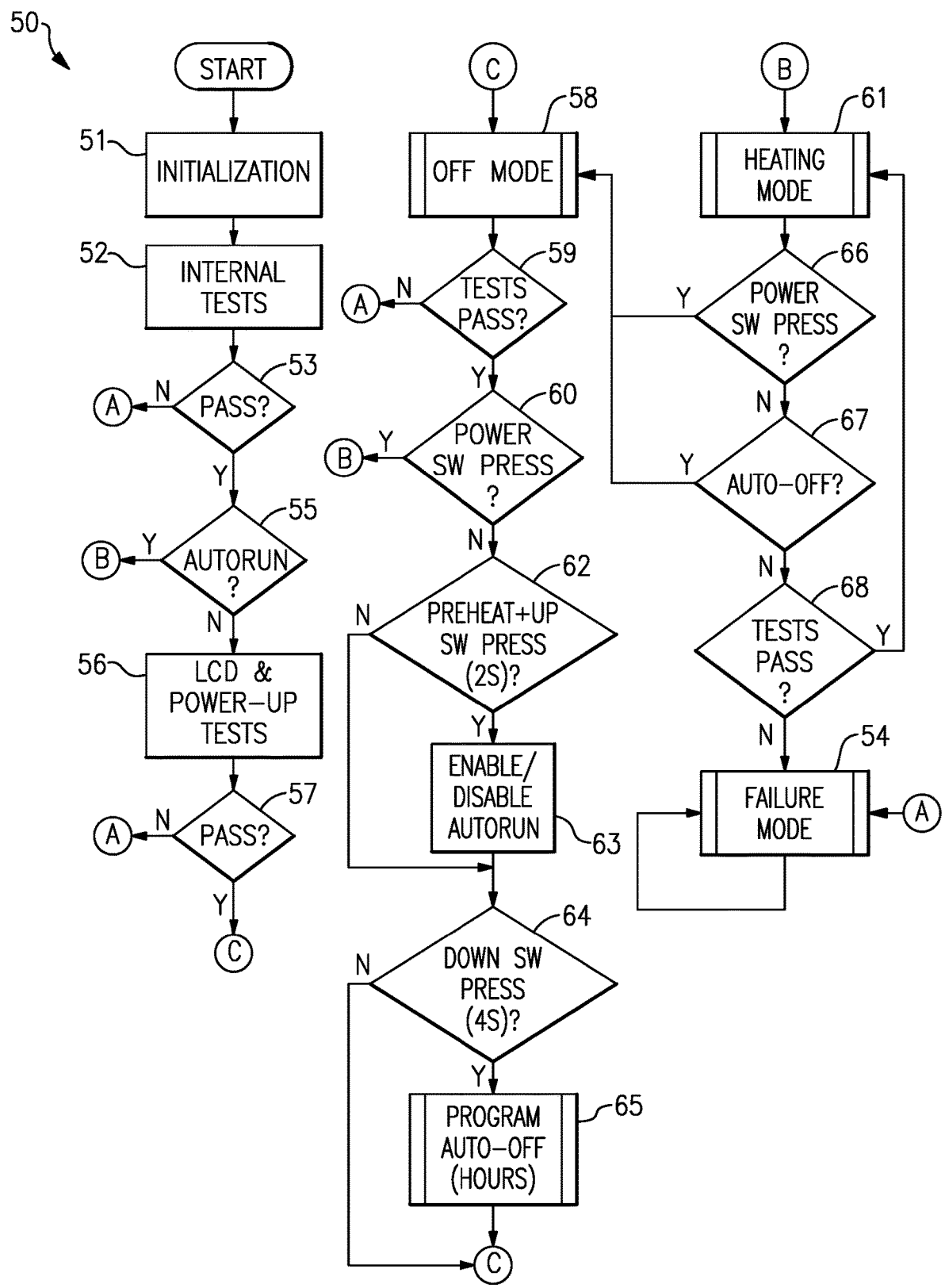
FIG. 5 is flow diagram of a process of operating a microcontroller of a heated bedding product according to an embodiment.

FIG. 5 is flow diagram of a process 50 of operating a microcontroller. The microcontroller can be implemented in any suitable controller for a heated bedding product, such as the controller of one or more of FIGS. 1 to 4. The microcontroller can be implemented in a heated bedding product that complies with a UL 964 standard. The microcontroller can be programmed with custom firmware that enables some or all of the process 50 to be performed. For example, instructions that cause the microcontroller to perform some or all of the process 50 can be programmed into non-volatile memory, such as read-only non-volatile memory. Microcontrollers can be programmed to perform a subset of the operations of the process 50 and/or additional operations. Moreover, the operations discussed with reference to the process 50 can be performed in any suitable order for operating a heated bedding product. Some or all of the process 50 can be implemented by any other suitable processing circuit such as a microprocessor and external peripherals. Moreover, embodiments are not limited to the exact sequence of acts described, nor are they necessarily limited to the practice of all of the acts set forth. Other sequences of events or acts, or less than all of the events, or simultaneous occurrence of the events, may be utilized in practicing certain embodiments.

AC power is applied to the microcontroller to start the process 50. A voltage switching device can transition from a state in which AC power is disconnected from the microcontroller to a state in which it provides AC power to the microcontroller. The voltage switching device can continue to provide AC power to the microcontroller throughout the process 50. At block 51, the microcontroller is initialized. As part of a startup self-test, internal tests are performed at block 52. Then, at decision block 53, it is determined whether the internal tests pass. If the internal tests fail, a failure mode can be activated at block 54. A user can be notified that the failure mode is activated. The microcontroller can remain in the failure mode until corrective action is taken. If the internal tests pass, it is determined whether the auto run mode is active at decision block 55.

After the auto run mode is determined to be inactive, power up test can continue. This can involve performing display and power up tests at block 56. If the tests are determined to fail at block 57, the failure mode can be entered at block 54. If the tests are determined to pass at block 57, an off mode can be activated at block 58. In the off mode, heating is not initiated until a user takes action, such as toggling a power switch.

In the off mode, it can be determined whether tests pass at block 59. If the tests fail, the failure mode can be entered at block 54. If the tests pass, the microcontroller can determine if a user action to initiate a heating process has occurred. For instance, the microcontroller can detect if a power switch is pressed at block 60. If a switch press is detected, a heating mode 61 can be activated. On the other hand, if a switch press is not detected, the microcontroller can then determine whether to toggle the auto run mode. For instance, the microcontroller can determine if the switch or one or more other switches (e.g., a pre-heat or user programming switch) has been pressed at block 62. After a switch pressed is detected at block 62, the auto run mode can toggle by changing from active to inactive or changing from inactive to active at block 63. After toggling the auto run mode or when the switch press is not detected, the microcontroller can determine if user input to program an auto-shutdown has been received at block 64. For instance, the microcontroller can determine if the switch or a different switch has been pressed at block 64. If a switch press is detected, the microcontroller can program an auto-shutdown after a period of time corresponding to user input elapses. After programming the auto-shutdown or if the switch press is not detected, the microcontroller can enter the off mode at block 58.

If the auto run mode is determined to be active at block 55, a heating cycle can begin at block 61. Accordingly, the microcontroller can automatically initiate a heating cycle in response to AC power being applied to the microcontroller without a user taking action after the AC power is applied. At block 66, the microcontroller determines whether a power switch is pressed. In the power switch is pressed, the microcontroller can enter the off mode at block 58. On the other hand, if the power switch press is not detected, the microcontroller can detect whether to auto-shutdown the heating process at block 67. For example, the microcontroller can be programmed to stop a heating cycle after a predetermined period of time has elapsed such as a maximum amount of time for a heating cycle (e.g., after 10 hours) and/or an amount of time programmed at block 65. If the microcontroller determines to auto-shutdown, the off mode is entered at block 58. Otherwise, one or more tests can be performed at block 58 to determine whether to continue operating in the heating mode at block 61 or to enter the failure mode at block 54.

While certain embodiments have been described, these embodiments have been presented by way of example and are not intended to limit the scope of the disclosure. The inventive subject matter is not limited to the particular forms or methods disclosed and covers all modifications, equivalents, and alternatives falling within the spirit and scope of the various implementations described and the appended claims. Indeed, the novel heated bedding products, systems, and methods described herein may be embodied in a variety of other forms. Furthermore, various omissions, substitutions and changes in the form of the methods, products, and systems described herein may be made without departing from the spirit of the disclosure. While elements are presented in a given arrangement, alternative embodiments may perform similar functionalities with different components and/or circuit topologies and some elements may be deleted, moved, added, subdivided, combined, and/or modified. Each of these elements may be implemented in a variety of different ways. Any suitable combination of the elements and operations of the various embodiments described above can be combined to provide further embodiments. The accompanying claims are intended to cover such forms and/or modifications and their equivalents as would fall within the scope and spirit of the disclosure.

What is claimed is:

1. A heated bedding system comprising:
   a bedding product body with an embedded heating element;
   a controller configured to control the heating element, wherein the controller comprises a microcontroller configured to emulate an air gap switch in an on position; and
   a voltage switching device configured to provide alternating current power to the controller, the voltage switching device being connected to the heating element by way of the controller;
   wherein the bedding product body and the controller are included in a heated bedding product that is in compliance with a UL 964 standard; and
   wherein the heated bedding system is configured to:
   receive a wireless signal; and
   in response to receiving the wireless signal, automatically initiate a heating cycle of the heating element when (i) the controller receives the alternating current power from the voltage switching device and (ii) the microcontroller emulates the air gap switch in the on position.

2. The heated bedding system of claim 1, wherein the wireless signal is a wireless local area network signal.

3. The heated bedding system of claim 1, wherein the microcontroller is configured to emulate the air gap switch in the on position in response to user input.

4. The heated bedding system of claim 1, wherein the microcontroller is configured to set an auto-shutdown time of the heating cycle.

5. The heated bedding system of claim 1, wherein the microcontroller is configured to perform a start-up test in response to receiving the wireless signal and to only automatically initiate the heating cycle in response to passing the start-up test.

6. The heated bedding system of claim 1, wherein the voltage switching device comprises a Wi-Fi switch.

7. A method of operating a heated bedding product, the heated bedding product comprising a heating element and a controller, the method comprising:
   wirelessly receiving a control signal;
   emulating, by a microcontroller of the controller of the heated bedding product, an air gap switch in an on position; and
   in response to the wirelessly receiving the control signal, automatically initiating a heating cycle of the heating element of the heated bedding product with the microcontroller of the controller emulating the air gap switch in the on position.

8. The method of claim 7, wherein the control signal is a wireless local area network signal.

9. The method of claim 7, wherein the heated bedding product complies with a UL 964 standard.

10. The method of claim 7, further comprising activating an auto run mode of the microcontroller in response to user input.

11. The method of claim 7, further comprising performing a start-up test in response to the wirelessly receiving the control signal, wherein passing the start-up test occurs prior to the automatically initiating the heating cycle.

12. The method of claim 7, wherein the wirelessly receiving the control signal causes alternating current power to be applied to the controller.

13. The method of claim 7, further comprising setting an auto-shutdown time of the heating cycle prior to the automatically initiating the heating cycle.

14. A heated bedding product comprising:
    a bedding product body with an embedded heating element; and
    a controller configured to control the heating element and to receive alternating current power, the controller comprising a microcontroller configured to emulate an air gap switch in an on position, wherein the controller is configured to automatically initiate a heating cycle of the heating element when (i) the controller receives the alternating current power and (ii) the microcontroller emulates the air gap switch in the on position, and wherein the heated bedding product is in compliance with a UL 964 standard.

15. The heated bedding product of claim 14, wherein the microcontroller is configured to perform a start-up test and to only automatically initiate the heating cycle in response to passing the start-up test.

16. The heated bedding product of claim 14, wherein the microcontroller is configured to activate an auto run mode of the microcontroller in response to user input.

17. The heated bedding product of claim 14, wherein the controller is configured to receive alternating current power from an alternating current power outlet.

18. The heated bedding product of claim 14, wherein the microcontroller is configured to operate in an auto run mode to automatically initiate the heating cycle after a power up self-test is complete, and wherein the microcontroller emulates the air gap switch in the on position in the auto run mode.

19. The method of claim 7, wherein the heated bedding product receives alternating current from an alternating current power outlet while the heating cycle is automatically initiated.

* * * * *